(12) United States Patent
Koster

(10) Patent No.: US 6,240,293 B1
(45) Date of Patent: May 29, 2001

(54) METHOD AND SYSTEM FOR PROVIDING LOCAL NUMBER PORTABILITY IN A WIRELESS TELECOMMUNICATIONS ENVIRONMENT

(75) Inventor: Karl H. Koster, Atlanta, GA (US)

(73) Assignee: BellSouth Intellectual Property Corporatio, Wilmington, DE (US)

( * ) Notice: Subject to any disclaimer, the term of this patent is extended or adjusted under 35 U.S.C. 154(b) by 0 days.

(21) Appl. No.: 09/244,866

(22) Filed: Feb. 5, 1999

Related U.S. Application Data

(60) Provisional application No. 60/073,909, filed on Feb. 6, 1998.

(51) Int. Cl.$^7$ .................................................. H04Q 7/20
(52) U.S. Cl. ................................. 455/445; 455/560
(58) Field of Search ........................ 455/445, 432, 455/433, 560

(56) References Cited

U.S. PATENT DOCUMENTS 6,161,017 * 12/2000 Britt ........................................ 455/445

* cited by examiner

*Primary Examiner*—Nguyen T. Vo
*Assistant Examiner*—James K. Moore
(74) *Attorney, Agent, or Firm*—Nora M. Tocups; James L. Ewing, V; Kilpatrick Stockton

(57) ABSTRACT

A system for processing wireless calls allows subscribers to port from one wireless service provider to another. Each mobile switching center stores a table containing a list of office codes for various directory numbers. Each office code in the table has a corresponding entry that indicates the portability of the office code. In addition, each office code has a corresponding entry that indicates whether the office code was originally assigned to the mobile switching center. When a call made to a directory number is routed to the mobile switching center, the switch accesses the table and references the office code of the directory number. If the office code is not portable and not originally assigned to the switch, the switch routes the call to the switch servicing the call. If the office code is not portable but originally assigned to the switch, the switch accesses a Home Location Register to determine the current status of the subscriber. If the office code is portable, the switch queries a Number Portability Database to obtain a local routing number, if available. Where no local routing number is provided, the switch queries the Home Location Register.

44 Claims, 6 Drawing Sheets

METHOD AND SYSTEM FOR PROVIDING LOCAL NUMBER PORTABILITY IN A WIRELESS TELECOMMUNICATIONS ENVIRONMENT

RELATED APPLICATIONS

This application claims priority to Provisional Patent Application No. 60/073,909, filed Feb. 6, 1998, entitled "Method and Apparatus For Facilitating Wireless Number Portability", which is incorporated by reference herein.

BACKGROUND OF THE INVENTION

1. Field of the Invention

The present invention is directed to wireless telecommunications and, more particularly, to a method and system for processing calls and providing local number portability in a wireless communications environment.

2. Background

Local number portability ("LNP") allows telephone subscribers to keep their phone numbers when they change residences and/or service providers. A mandate of the Telecommunications Act of 1996, this option must have been made available to wireline subscribers in the top 100 markets by the end of 1998. The advantages of retaining one's phone number were recognized in exchange tariffs as early as the 1960s. The issue also cropped up in the 1980s and early 1990s, when portability for 800 numbers was instituted to encourage competition in the toll-free long-distance sector. More recently, a survey conducted by the Gallup poll found that nearly 80 percent of residential subscribers and 90 percent of business subscribers would be unwilling to change service providers if they had to surrender current phone numbers.

While implemented in land-based telephone networks, LNP provides additional challenges when implemented in wireless networks. In land-based networks, queries are launched to a number portability database ("NPDB") containing a list of telephone numbers that have switched (or "ported") to other service providers. The NPDB includes the number and routing information of the new service provider (the "ported-to service provider") and returns this information (the "Local Routing Number") to a switch in the network of the original service provider (the "donor service provider"). The switch can then route the call to the proper network.

In a wireless network, local number portability is more complicated. One initial difference is that many wireless networks identify the subscriber's mobile set with a Mobile Identification Number ("MIN") which is used in part to complete the call. A home location register ("HLR") stores the unique MIN and Electronic Serial Number ("ESN") contained in each subscriber's mobile set and associates this with the mobile directory number ("MDN"). Currently, the MIN and MDN values are the same number. With LNP, these values are likely to be different for ported numbers.

Each time a call is made to a wireless subscriber, the wireless service provider uses the MDN to check the HLR to determine the location of the mobile subscriber. In order for the call to reach the correct wireless service provider, the NPDB may be accessed. Thus, the data contained in each HLR must be synchronized with the information in the NPDB in order for the call to ultimately reach the subscriber. The synchronization of HLRs and NPDBs between the old and new service provider is a large challenge facing wireless number portability. Synchronization of the NPDBs is accomplished in part with the services of the Number Portability Administration Center ("NPAC") which serves as a "master coordinator" of the NPDB information among service providers. However, each service provider must coordinate their HLRs and NPDBs by themselves. If done incorrectly, calls may not complete to the subscriber.

LNP also impacts current procedures in which service providers populate HLRs with blocks of new numbers and process vacant numbers. Typically, when a new central office codes (i.e., the NPA-NXX portion of the directory number) is obtained, it is provisioned on the serving mobile switching center ("MSC") so that calls to that number result in a query to the HLR. Each code served by the MSC allows the service provider to serve up to 10,000 individual numbers. Initially, the numbers are not assigned to subscribers ("vacant") but as time goes on they are assigned to new subscribers and considered "active". Calls to vacant numbers are routed to an announcement indicating the number is not in service. Rather than initially listing all 10,000 numbers with a indicator as "active" or "vacant", the HLR only lists active numbers. It is presumed that an absent number is a vacant number.

When a service provider ports in a subscriber, the central office code must be listed as one that is served by the MSC. Thus, the central office code for that number is provisioned on the MSC. In addition, the subscriber's number is populated in the HLR. Thus, the HLR lists that number as active. Since the other numbers in the code are not in the HLR, the HLR treats them as vacant. However, those other numbers are not necessarily vacant and are actually allocated to other service providers—either the original service provider assigned the code or to some other ported-to service provider.

Thus, numbers not listed in the HLR for which the NPA-NXX is provisioned in the MSC can represent three situations: (1) the subscriber canceled his service; (2) the subscriber ported out to another service provider; or (3) that number was never served by the MSC but is allocated to some other provider. These situations must be distinguished. Where a subscriber has canceled service, the service provider should provide an announcement to a caller that the number is no longer in service or has been disconnected. Where a customer has ported out his number or the number is allocated to some other service provider, the MSC should route the call to the correct service provider. Currently, when a query is launched to the HLR and it does not find a number present, it presumes it is vacant. The current procedures between the MSC and HLR cannot distinguish between a vacant number, ported out number, or number assigned to another service provider.

Unfortunately, providing HLRs with the proper functionality would be inordinately expensive and time-consuming. It would require all 10,000 numbers in each number in a central office code to be explicitly identified. In addition, the signaling protocol between the MSC and HLR would have to be modified to communicate this new status information. Furthermore, significant impact to a service provider's provisioning systems and business flows would be required to support this. A method that allows properly distinguishes the situation without modification of the HLR would facilitate the introduction of wireless number portability.

SUMMARY OF THE INVENTION

This invention overcomes problems associated with implementing number portability in a wireless telecommunications environment by providing a mechanism for determining how to process the call. Specifically, the method and system of this invention store data regarding the portability and assignment of office codes in a mobile switching center and minimizes the impact on the HLR. This invention involves the creation of a table ("portability information table") that includes cross references for each central office code that is served by the MSC to indicate: (1) whether the central office code was originally assigned to the MSC or whether it was "ported in"; and (2) whether the central office code is "portable". The first indicator shows whether the central office code was originally allocated to the MSC (as indicated in the Local Exchange Routing Guide or "LERG"). If the indicator was not originally allocated to the MSC, then the central office code was provisioned on the MSC because it was "ported-in". This is referenced herein as the "LERG Assigned" indicator. The second indicator shows whether that code is open for portability.

The portability information table may be implemented by integrating it with existing routing tables contained in MSCs. Alternatively, the table may be implemented as a separate table that interacts with the existing routing table. In either case, for a given NPA-NXX, it is important for the MSC to know: 1) whether the HLR potentially may have to be queried, 2) whether the NPA-NXX of the called party number is portable and a query required to the NPDB, and 3) whether the NPA-NXX of the called party number was originally assigned to the MSC or ported-in.

For calls made to central office codes that are not portable, call processing is the same as without number portability. The MSC will examine the NPA-NXX portion of the called party, examine the portability information table, and either route the call to a trunk group or query the HLR. For calls made to office codes indicated as portable, the MSC should query the number portability database ("NPDB"). Based on the response, the call will be routed out or an HLR query will be performed. If the HLR query is performed, the response will be interpreted according to whether the NPA-NXX was ported in or LERG assigned to the MSC. Thus, the initial query to the NPDB determines whether an HLR query is required.

There is an added benefit by performing the NPDB query first and potentially avoiding the HLR query. If a subscriber ports out, then once the NPDB is updated the call will be correctly routed to the new service provider and avoiding the HLR query. Once the service provider updates the NPDB it is not necessary to immediately update the HLR by removing the ported out subscriber's number. If the ported-out subscriber information is retained for a matter of hours, it will not adversely impact call routing. However, if the HLR query is done first, then this requires the service provider to precisely synchronize the update of the HLR in order to presume proper interpretation of the HLR result. The only other way to avoid this is to perform the NPDB query, but this results in additional queries and negates any benefit. The preferred embodiment of querying the NPDB first allows the HLR to be updated asynchronously which presents an operational advantage to the service provider.

When a subscriber ports to another network, the new ("ported-to") service provider informs the old ("donor") service provider of the change. The old and new service providers update their respective MSCs to indicate the central office code is portable if the code has not already been indicated as such. Consequently, after the first number in a code is ported, the portability indicator is set for that central office code in the MSC and no further updating of that code is required if other numbers within that code subsequently port in or out.

At the beginning of portability, all codes served by the MSC are stored in the portability information table and indicated as LERG assigned. When a subscriber ports in, if the NPA-NXX portion of their number is not in the portability information table, it must be added and indicated as portable and "not-LERG assigned". No updates to the table are required for subsequent numbers that port using the same code. However, updates to the HLR will be required.

The portability information table allows the MSC to efficiently handle ported and non-ported calls when processing calls. If the central office code of the called party number is neither portable nor LERG-assigned, then it is known that the number has not ported and is not served by the switch. The MSC consults the routing table which indicates the associated trunk group for that NPA-NXX. If the office code is not portable, but assigned to the MSC, the MSC queries the HLR. The HLR responds to the MSC by indicating the current status (active or vacant) of the number. The MSC routes the call appropriately or provides vacant code treatment.

For office codes that are portable, the table indicates, in part, the need for the MSC to access the NPDB. The switch may also need to access the HLR. In this invention, it is preferable the NPDB query occur first. Based upon the results of the NPDB query, the switch can determine whether an HLR query is warranted. If the office code is portable but not LERG-assigned, the switch queries the NPDB and the NPDB may return a local routing number (LRN). If a local routing number is returned and associated with that switch, the MSC accesses the HLR to determine the location of the mobile subscriber. If the LRN is associated with another switch or no routing number is returned (indicating the called party is served by the original service provider), the MSC routes the call to the indicated trunk group. No HLR query is performed Thus, by querying the NPDB first, the switch can avoid a potentially unnecessary HLR query.

Similarly, if the code is portable and assigned to the MSC, the MSC performs an NPDB query. If the NPDB returns a LRN associated with some other switch, this indicates the subscriber has ported out of the network. The MSC routes the call to the trunk group associated with the routing number. If an LRN is returned that is associated with that MSC or no routing number is returned, the switch performs a HLR query to determine the status of the subscriber. The switch may then route the call to an active subscriber or provide the vacant code treatment whichever is appropriate.

The invention, as broadly described herein, is a system for processing calls in a wireless telecommunications network comprising: a mobile switching center operable to route a call made to a directory number based upon a central office code of the directory number, the mobile switching center storing a table containing: a plurality of central office codes; a first flag indicating the portability of the central office codes; and a second flag indicating the assignment of the central office codes to the mobile switching center; a number portability database communicating with the mobile switching center, the number portability database storing a plurality of local routing numbers associated with a plurality of ported directory numbers; and a home location register communicating with the mobile switching center, the home location register storing a plurality of mobile directory numbers.

It is an object of this invention to provide a system and method for routing calls to ported and non-ported subscribers in a wireless telecommunications network.

It is yet another object of this invention to provide a system and method for routing wireless calls to ported and non-ported subscribers that does not require exact synchronization of HLRs with the NPDB.

It is a further object of this invention to provide a system and method for routing wireless calls to ported and non-ported subscribers that distinguishes between vacant and active subscribers.

It is an additional object of this invention to provide a system and method for routing wireless calls to ported and non-ported subscribers that queries the number portability database and home location register in an efficient manner.

It is yet another object of this invention to provide a cost-effective system and method for routing wireless calls to ported and non-ported subscribers.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

Reference will now be made in detail to a preferred embodiment of the invention, examples of which are illustrated in the accompanying drawings. Wherever possible, the same reference numbers will be used throughout the drawings to refer to the same or like parts.

Figure 1:
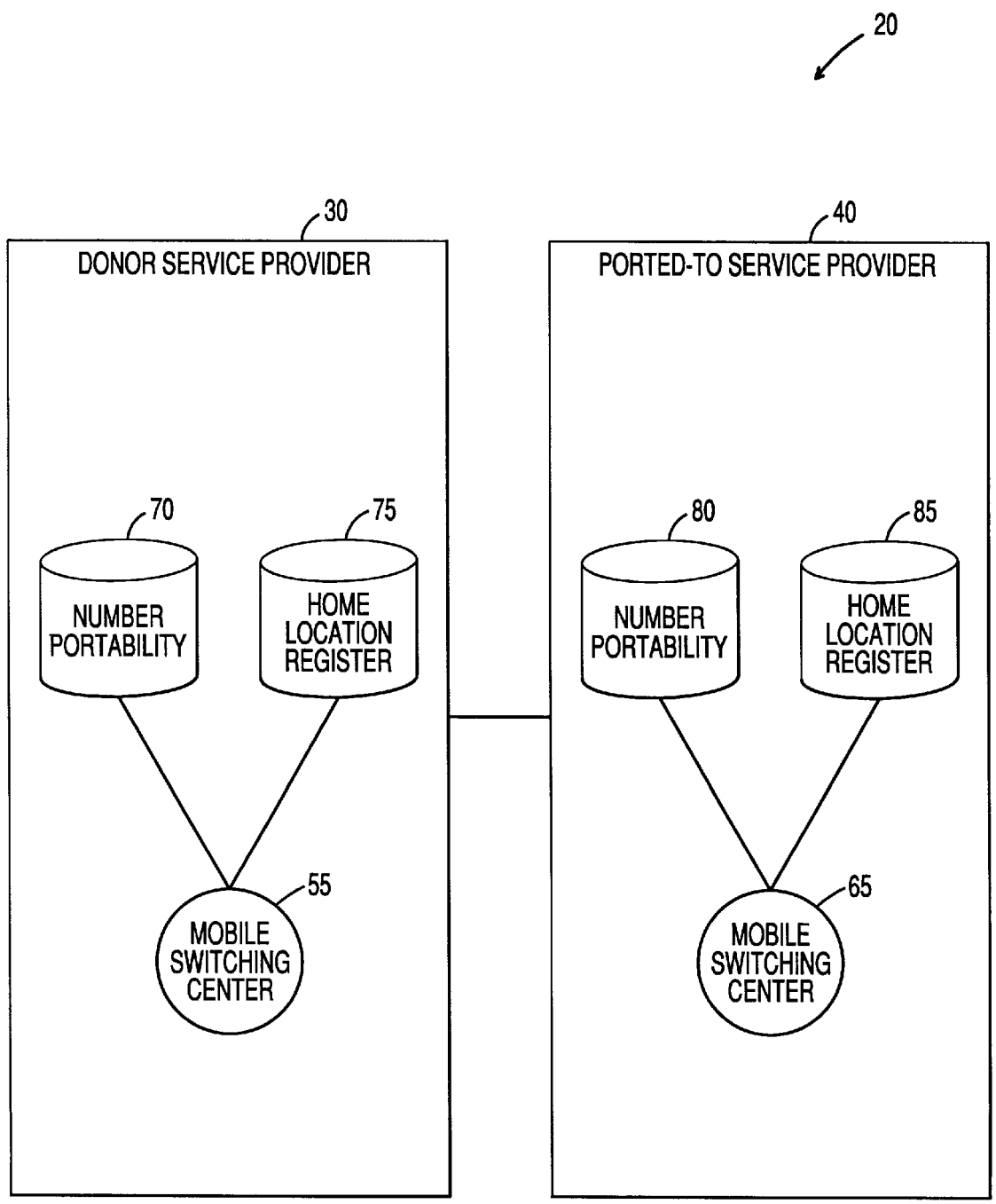
FIG. 1 is a block diagram of a wireless network according to a preferred embodiment of this invention.

FIG. 1 is a block diagram of a wireless network 20 containing a wireless sub-network 30 controlled and operated by a donor service provider and another wireless sub-network 40 controlled and operated by a "ported-to" service provider. Both networks provide wireless service to respective wireless subscribers. "Wireless service" includes, but is not limited to, cellular telephone service, mobile telephone service, personal communication systems ("PCS") service, cordless service, and wireless office telephone system ("WOTS") service.

The present invention facilitates the portability of a telephone number assigned to a subscriber of the donor service provider sub-network 30 to the ported service provider sub-network 40. Both networks 30, 40, include one or more mobile switching centers ("MSCs") 55, 65. The terms "switch" and "MSC" are used interchangeably herein. The MSCs process requests for service from wireless telephones and land line callers, and route calls between wireless base stations (not shown) and the Public Switched Telephone Network ("PSTN"). The MSCs receive the dialed digits, create and interpret call processing tones, and route the call paths. Both networks 30, 40 further include a home location register ("HLR") 75, 85. The HLR is a subscriber database containing each customer's Mobile Directory Number ("MDN"), Mobile Identification Number ("MIN") and Electronic Serial Number ("ESN"). Each customer's user profile may include a selected long distance carrier, service fee charge rates, and other selected network options. The MSC 55, 65 uses this information to authorize system access and process individual call billing.

When a subscriber of the donor service provider sub-network 30 desires to port his number to the ported-to service provider sub-network 40, it is expected that the new (ported-to) service provider initiates communication with the donor service provider to coordinate the porting of the subscriber. The new service provider also initiates an activation request with a Number Portability Administration Center ("NPAC"), a number portability clearinghouse managed by a neutral third party. The NPAC maintains and coordinates a database of ported customer telephone numbers and other related information to be used by all service providers within a service region. The new service provider coordinates its HLR update with the NPAC activation request. This coordination includes the programming of the subscriber's Mobile Directory Number ("MDN") into the ported service provider's HLR and associating this with a new MIN of the service provider's selection. Once the NPAC has updated the NPDB and the donor service provider has updated their copy of the NPDB, the service provider may remove its HLR entry for the ported-out subscriber.

Figure 2:
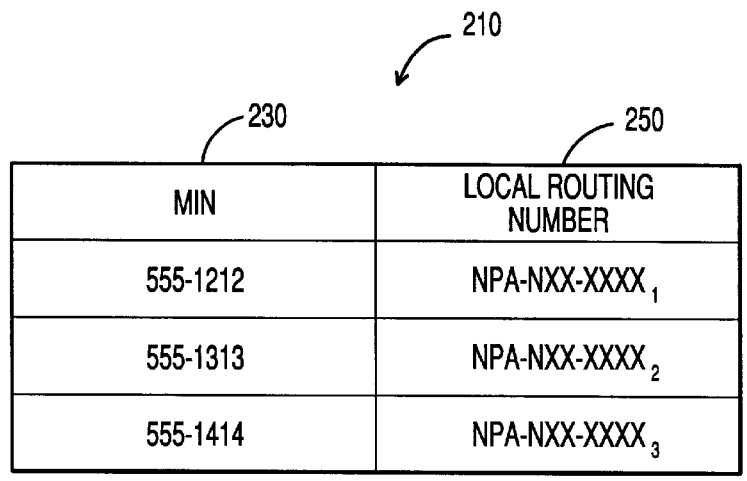
FIG. 2 is a block diagram of a table stored in a number portability database according to a preferred embodiment of this invention

To keep track of subscribers that have ported out of a network, each network 30, 40 includes or accesses a number portability database ("NPDB") 70, 80. FIG. 2 illustrates a table 210 stored in a number portability database. The table 210 includes a first column 230 containing a list of MDNs for network subscribers that have ported to another network. For each ported MDN, the table 210 stores an identifier for routing the call to the ported service provider. The identifier 250 is called a Local Routing Number ("LRN") that identifies the appropriate serving switch for the service provider. The Local Routing Number is of a format ("NPA-NXX-XXXX") similar to a telephone number. In some systems, if a number is not portable, the NPDB may indicate this by not returning a LRN value in response to the query or by returning a value equal to the number contained in the initial query. As used herein, the latter is not construed as returning an LRN value. In prior art systems, the donor service provider checks the NPDB to determine whether or not a subscriber has ported to another service provider. If the subscriber has ported, the service provider uses the LRN 250 to route the call to the ported service provider. In the prior art, however, no clear criteria exist for determining when a service provider should query the NPDB relative to querying the HLR or how to distinguish vacant numbers from ported out numbers. In the present invention, the service provider uses information stored in the MSC to determine when the NPDB should be accessed relative to the HLR and how to process the call based on the information in the MSC and the results of the NPDB and HLR queries.

In addition, each MSC 55, 65 serves a particular group of telephone numbers. For a ten-digit directory number in the format of NPA-NXX-XXXX, the first six digits (the "NPA-NXX") is termed the "central office code." Presently, wireless service providers provision such served central office codes on the serving MSC. The MSC uses the central office code to determine whether to route calls to other service providers or complete the call within the MSC. Central office codes served by the MSC allow the service provider to serve up to 10,000 individual numbers. The HLR stores the information specifying individual numbers within the set of NPA-NXXs as active or vacant. As an implementation option, the HLR may only list numbers that are active and presume if the numbers is absent that it is vacant. When a subscriber ports into the network, a new NPA-NXX is provisioned on the serving switch, if it already has not been provisioned. Only one number, however, (the ported number) will be shown as active in the HLR. The remaining 9,999 numbers will be presumed as "vacant" by the HLR. This is inaccurate since those numbers are actually allocated to other service providers and will result in incorrect call processing. Thus, the absence of a number in the HLR from a given NPA-NXX code could represent a vacant number or a number that ported out to another service provider. The actual status is determined in conjunction with the information in a table 300 contained in the MSC.

Figure 3:
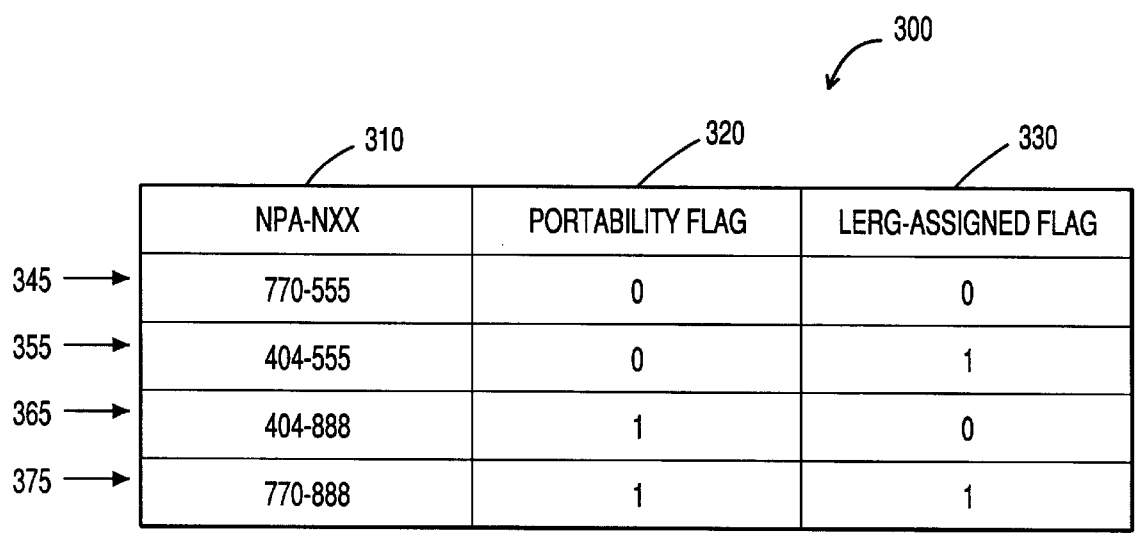
FIG. 3 is a block diagram of a table stored in a mobile switching center according to a preferred embodiment of this invention.

The method and system of this invention includes an MSC that stores a portability information table 300 as shown in FIG. 3. The table may be stored separately in a memory of the MSC. Alternatively, the table 300 may be integrated into an existing routing table of the MSC. The portability information table includes three columns: (1) a NPA-NXX value 310; (2) a portability flag 320; and (3) a Local Exchange Routing Guide ("LERG")-Assigned flag 330. The NPA-NXX value corresponds to the NPA-NXXs served by the MSC. The portability flag 320 marks the NPA-NXX as being portable. Portable numbers require a query to the NPDB to determine whether or not the number has been ported. The LERG-Assigned flag 330 indicates whether or not the NPA-NXX was originally assigned to the service provider or provisioned because a subscriber ported in. NPA-NXXs are flagged using any known method for flagging data. In FIG. 3, a binary "1" indicates a "yes", "true", "set", or "flagged" value. A binary "0" indicates a "no", "false" "not set" or "unflagged" value. These binary values are used for exemplary purposes only. Other values may be used, including, for example, true/false indicators.

The table 300 illustrates the four possible scenarios for a given NPA-NXX:

Scenario 1—NPA-NXX is not portable; NPA-NXX is not LERG-assigned.

As shown in FIG. 3, the NPA-NXX value listed in the first row 345 of the table 300 has neither the portability flag set nor the LERG-Assigned flag set. Thus, the central office code is not based in the MSC and it has not been opened for portability. The MSC would not perform a number portability search to the NPDB. Moreover, the MSC would not perform a search in the HLR. Since the number is not served by the MSC, the call is routed according to trunk group associated for that NPA-NXX. This is contained in a separate existing routing table in the MSCs.

Scenario 2—NPA-NXX is not portable; NPA-NXX is LERG-Assigned.

In the second row 355 of FIG. 3, the LERG-Assigned flag is set for the NPA-NXX while the number portability flag is not set. Thus, the central office code has been provisioned in the switch and it may contain active subscribers but none have ported in or out. Since the number is not portable, the MSC will not perform a search in the NPDB. The MSC will perform a query to the HLR to determine the status of the subscriber. The response of the HLR will indicate whether the number is active or vacant based on current procedures and the MSC should route appropriately.

Scenario 3—NPA-NXX is portable; NPA-NXX is not LERG-Assigned.

In the third row 365 of the table 300 of FIG. 3, the number portability flag is set for the NPA-NXX while the LERG-Assigned flag is not set. This scenario would occur under several circumstances. First, this would occur if the called subscriber has ported into the sub-network and is served by the MSC. Second, if the called subscriber was originally served by some other service provider but has ported to yet another service provider, this scenario would occur. Finally, this scenario might occur if the called subscriber has not ported at all and is served by the original assignee (code holder) of the NPA-NXX. In this scenario, the MSC should perform a NPDB query and/or an HLR query. The preferred sequence of queries is described below with respect to the call flow processing.

Scenario 4—NPA-NXX is portable/NPA-NXX is LERG-Assigned.

As illustrated in FIG. 3, the NPA-NXX of the last column 375 is both portable and LERG-Assigned. Since the number was originally assigned to the switch, subscribers are likely served within that number range. Since the number is portable, the MSC should query the NPDB. However, if the subscriber has not ported out, the MSC must query the HLR to determine whether the dialed number is active or vacant. The preferred sequence of queries is described below with respect to the call flow processing.

Figure 4:
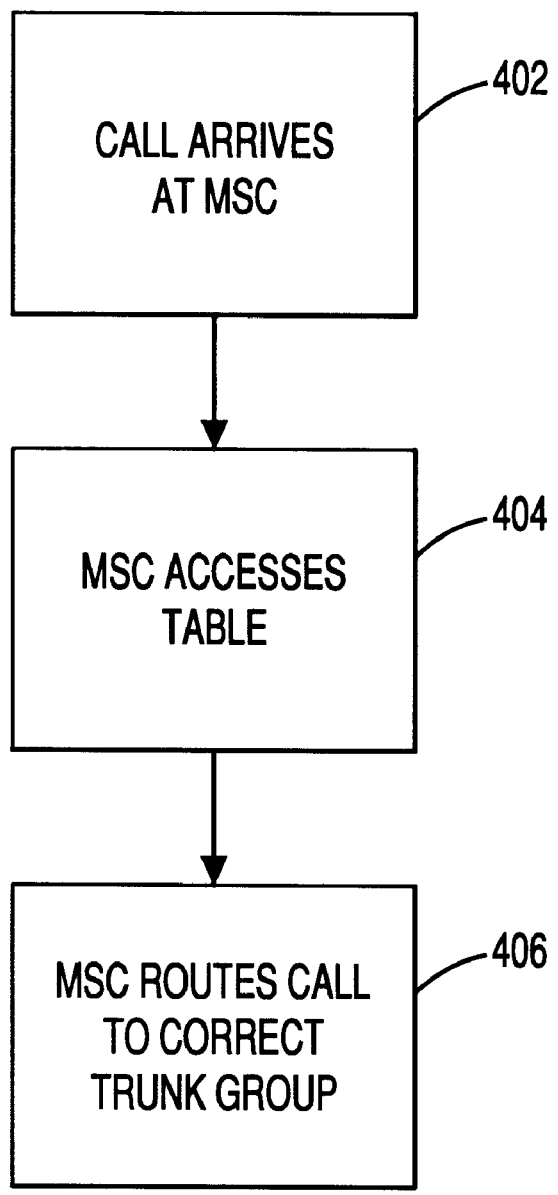
FIG. 4 is a flow chart illustrating the call processing that occurs when a call is made to a non-portable, non-LERG-assigned office code.

FIG. 4 is a flow chart illustrating the call processing flow when the dialed code is neither portable nor LERG-Assigned. In step 402, the call is processed at the MSC. The call could have been originated by a mobile subscriber served by that switch or could have been received from a trunk connected to another switch. Next, in step 404, the MSC accesses the table to determine which flags are set for the NPA-NXX of the dialed code. Since neither flag is set, the MSC performs no queries. The call is routed to the appropriate trunk group associated with the code in step 406. This information is contained in a separate existing routing table.

Figure 5:
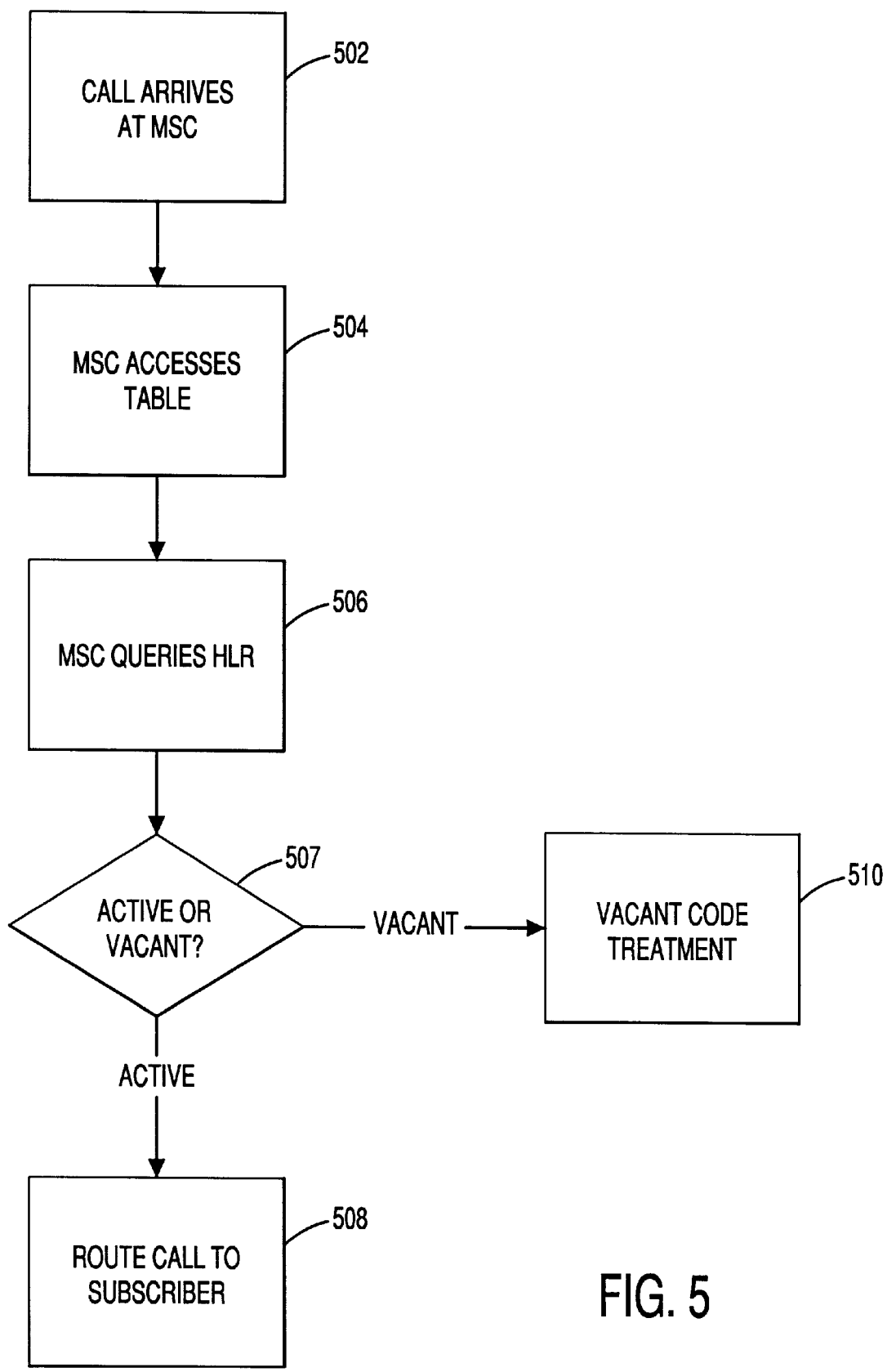
FIG. 5 is a flow chart illustrating the call processing that occurs when a call is made to a non-portable, LERG-assigned office code.

FIG. 5 is a flow chart illustrating the call processing flow when the dialed code is not portable but LERG-Assigned. In step 502, the call is processed by the MSC. In step 504, the MSC accesses the table 300 to determine which flags have been set for the code. Since the code is flagged as not portable, there is no query launched to the NPDB. The code is flagged as LERG-Assigned, so the MSC queries the HLR in step 506. The switch responds to the results of the HLR query in the same manner as occurred prior to number portability. If the number represents an active subscriber, the switch will route the call to the proper destination in step 508. If the HLR indicates the number as vacant, the switch can provide the appropriate vacant code treatment in step 510 (e.g., playing a message to the caller indicating that the number is not in service).

Figure 6:
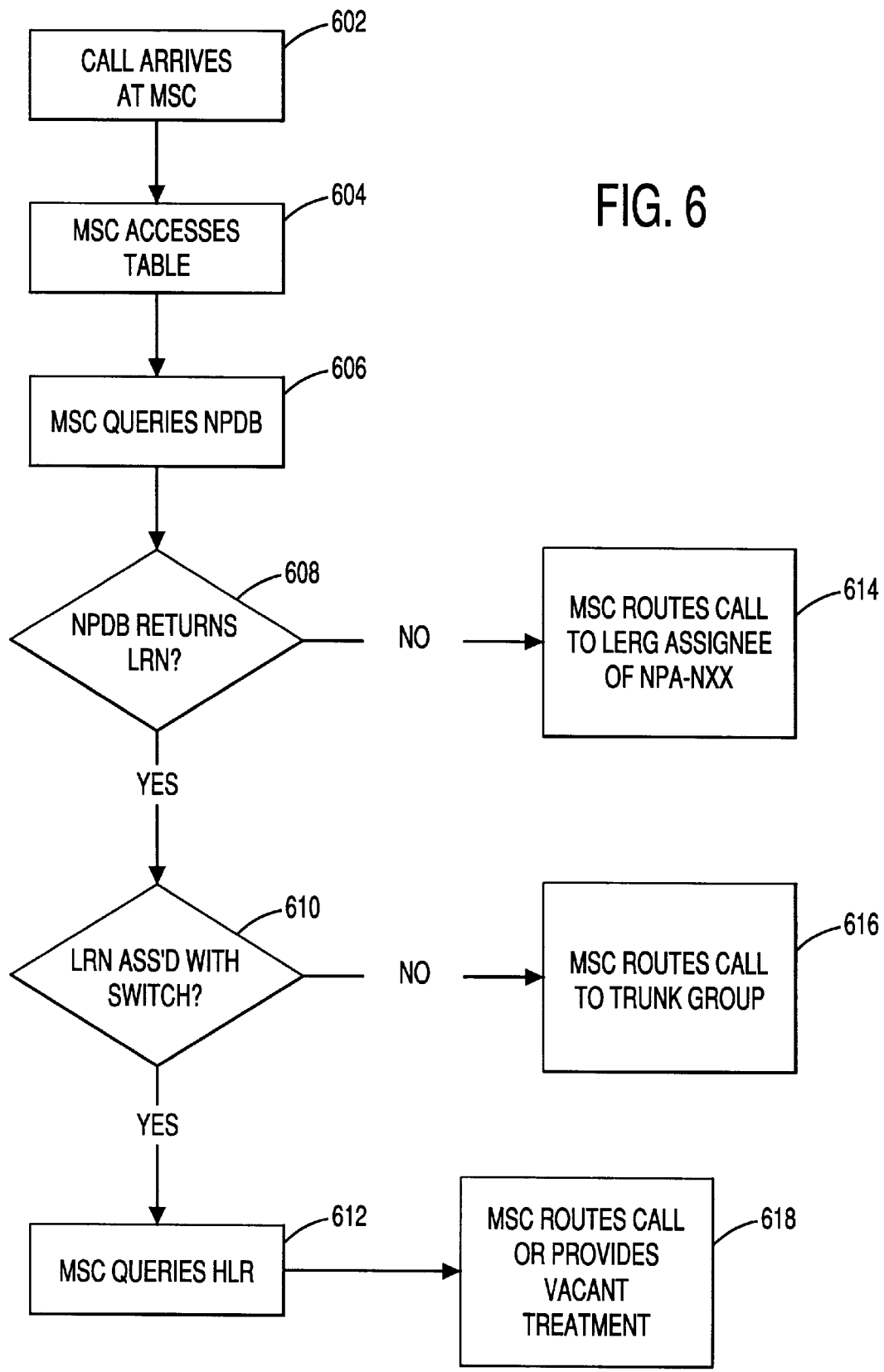
FIG. 6 is a flow chart illustrating the call processing that occurs when a call is made to a portable, non-LERG-assigned office code.

FIG. 6 is a flow chart illustrating the call processing flow when the dialed code is portable, but not LERG-Assigned. In step 602, the call arrives at the switch. In step 604, the switch accesses the table 300 to determine which flags have been set. As discussed above, the called party may be: (1) served by the original service provider; (2) served by another service provider; or (3) served by the MSC processing the call. In the last case, the HLR may or may not store a profile for the specific directory number since it may be active or vacant.

The MSC may query either the NPDB or the HLR first to determine the appropriate treatment for the call. As will be shown, however, it is advantageous to begin by querying the NPDB in step 606. The NPDB will return a Local Routing Number ("LRN") if the number has been ported. If a LRN is returned but not associated with the MSC, the switch routes the call according to the routing tables associated with the NPA-NXX of the LRN. If the LRN is associated with the MSC, itself, then in step 612, the switch performs an HLR query and responds accordingly. If the NPDB does not return an LRN, then the called party has not ported from their original service provider. The called party is served by the LERG assignee of the dialed code. In step 616, the switch routes the call to the correct trunk group based on the NPA-NXX of the called party number using a separate existing routing table. Thus, by initially querying the NPDB, the switch can determine whether an HLR search is necessary.

Figure 7:
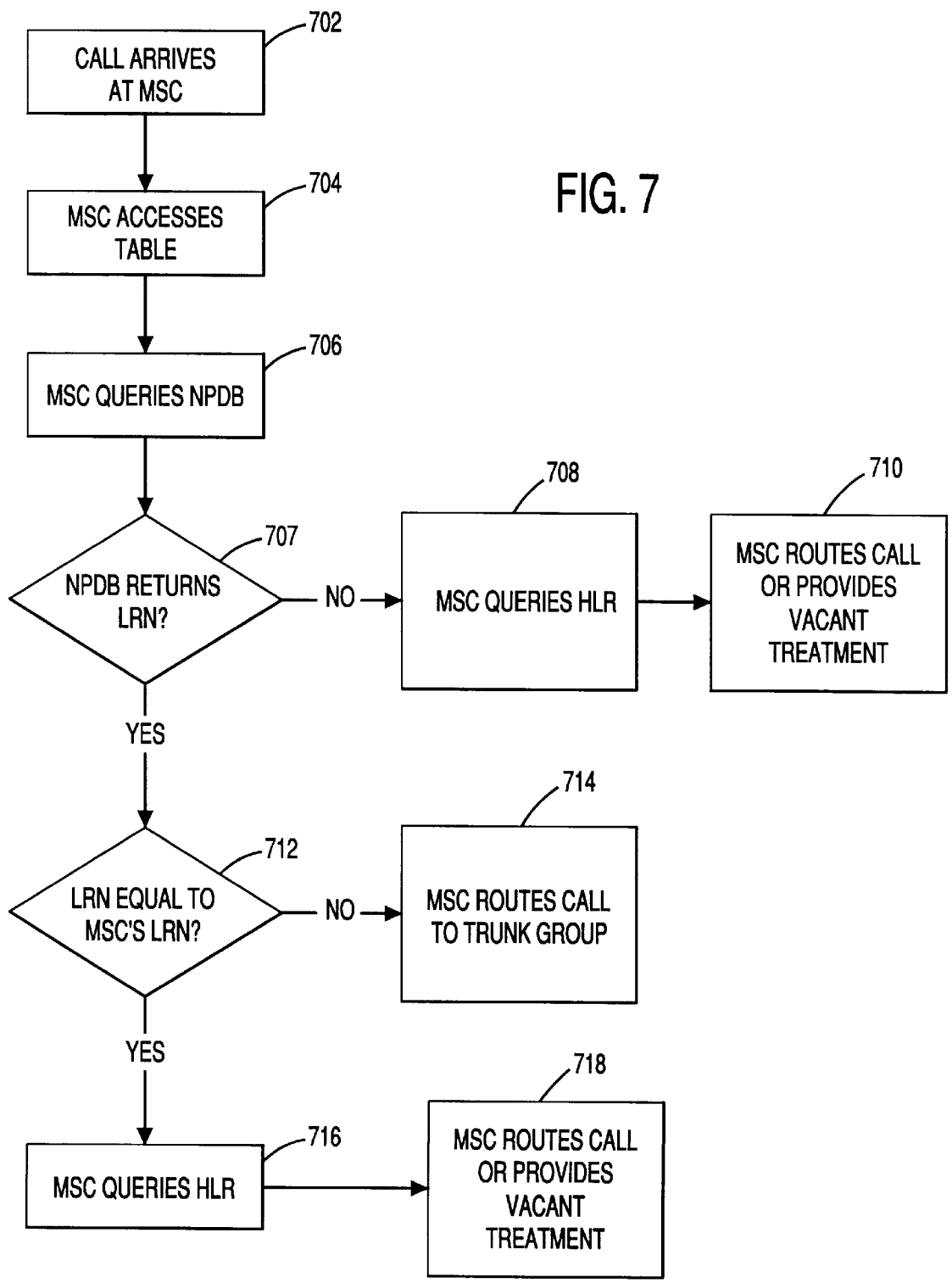
FIG. 7 is a flow chart illustrating the call processing that occurs when a call is made to a portable, LERG-assigned office code.

FIG. 7 is a flow chart illustrating the call processing flow when the dialed code is both portable and LERG-Assigned. In step 702, the call arrives at the MSC. In step 704, the switch queries the table 300. The table shows the NPA-NXX as being both portable and LERG-Assigned. The NPDB may indicate that the called party has ported out of the network. However, the absence of a profile in the HLR may indicate that the subscriber has ported out or has canceled his service. The MSC may perform the NPDB query or the HLR query in any order, but performing the NPDB query first allows consistent call processing logic and allows asynchronous HLR updating for ported out subscribers.

The NPDB query will either return an LRN or not. If the NPDB returns a LRN of some other service provider, the subscriber has ported out of the network. In step 708, the MSC routes the call to the trunk group associated with the LRN value. No HLR query is performed. If the LRN returned is associated with the MSC, this might indicate that the subscriber has ported back into their original service provider and an HLR query would be performed. If no LRN is returned, the number has not ported out and the MSC should perform an HLR query. The HLR query will return an active or inactive profile. If the HLR returns an active profile, the call should be processed according to the existing mobility procedures. If the HLR indicates the number is vacant, the switch should perform the appropriate vacant code treatment.

The table allows the switch to perform additional procedures to handle errors that may occur when processing a call received from a SS7 trunk. Upon receiving an Initial Address Message, for example, the MSC could examine the value contained in the Called Party Number Parameter. This value may represent the called party's number or LRN and is determined by the value of the Generic Address Parameter ("GAP"). If the NPA-NXX portion of this parameter is flagged in table 300 as not LERG-Assigned, the MSC should clear the call using the appropriate cause code. If the NPA-NXX is flagged as LERG-Assigned, the Generic Address Parameter ("GAP") value should be checked if present. If the GAP parameter is not present, the switch processes the call as a call to a non-ported number. If the GAP parameter is present, then the NPA-NXX value should correspond to a code marked as portable. If so, the call is processed according to the normal procedures described above. If the NPA-NXX of the GAP parameter does not correspond to a portable code, the call should be cleared with a cause code.

Having thus described a preferred embodiment of a system and method for facilitating wireless number portability, it should be apparent to those skilled in the art that certain advantages have been achieved. It should also be appreciated that various modifications, adaptations, and alternative embodiments thereof, including maintaining information in the HLR pertaining to whether a number has ported out versus become inactive, for example, may be made within the scope and spirit of the present invention. The invention is further defined by the following claims:

What is claimed is:

1. A system for routing calls in a wireless telecommunications network comprising:
    a mobile switching center operable to route a call made to a directory number based upon a central office code of the directory number, the mobile switching center storing a table containing:
        a plurality of central office codes;
        a first flag indicating the portability of the central office codes; and
        a second flag indicating the assignment of the central office codes to the mobile switching center;
    a number portability database communicating with the mobile switching center, the number portability database storing a plurality of local routing numbers associated with a plurality of ported mobile directory numbers; and
    a home location register communicating with the mobile switching center, the home location register storing a plurality of mobile directory numbers.

2. The system for routing calls, as recited in claim 1, wherein if the first flag and the second flag are not set, the mobile switching center is operable to route the call to a trunk group associated with the office code of the directory number.

3. The system for routing calls, as recited in claim 1, wherein if the first flag is not set and the second flag is set, the mobile switching center is operable to query the home location register to determine whether the mobile switching center services the directory number.

4. The system for routing calls, as recited in claim 3, wherein the mobile switching center is operable to route the call to a destination based upon the results of the query to the home location register.

5. The system for routing calls, as recited in claim 3, wherein the mobile switching center is operable to provide a predetermined vacant code treatment based upon the results of the query to the home location register.

6. The system for routing calls, as recited in claim 1, wherein if the first flag is set and the second flag is not set, the mobile switching center is operable to query the number portability database.

7. The system for routing calls, as recited in claim 6, wherein the mobile switching center is operable to route the call according to a routing table associated with the office code of a routing number returned by the number portability database.

8. The system for routing calls, as recited in claim 6, wherein the mobile switching center is operable to perform a second query to the home location register based upon the results of the query to the number portability database.

9. The system for routing calls, as recited in claim 1, wherein if the first flag and the second flags are set, the mobile switching center is operable to query the number portability database to determine whether the directory number is ported.

10. The system for routing calls, as recited in claim 9, wherein the mobile switching center is further operable to route the call to a trunk group associated with a local routing number returned by the number portability database.

11. The system for routing calls, as recited in claim 9, wherein the mobile switching center is further operable to query the home location register based upon the results of the query to the number portability database.

12. A system for routing a call to a directory number in a wireless telecommunications network comprising:
- a mobile switching center storing a table containing:
  - at least one central office code;
  - a first true/false indicator of the portability of the at least one central office code; and
  - a second true/false indicator of the assignment of the at least one central office code to the mobile switching center;
- a number portability database communicating with the mobile switching center, the number portability database storing a plurality of local routing numbers associated with a plurality of ported mobile directory numbers; and
- a home location register communicating with the mobile switching center, the home location register storing a plurality of directory numbers.

13. The system for routing calls, as recited in claim 12, wherein if the first indicator is false and the second indicator is false, the mobile switching center is operable to route the call to a trunk group associated with an office code of the directory number.

14. The system for routing calls, as recited in claim 12, wherein if the first indicator is false and the second indicator is true, the mobile switching center is operable to query the home location register to determine whether the mobile switching center services the directory number.

15. The system for routing calls, as recited in claim 14, wherein the mobile switching center is operable to route the call to a destination based upon the results of the query to the home location register.

16. The system for routing calls, as recited in claim 14, wherein the mobile switching center is operable to provide a predetermined vacant code treatment based upon the results of the query to the home location register.

17. The system for routing calls, as recited in claim 12, wherein if the first indicator is true and the second indicator is false, the mobile switching center is operable to query the number portability database.

18. The system for routing calls, as recited in claim 17, wherein the mobile switching center is operable to route the call according to a routing table associated with the office code of a routing number returned by the number portability database.

19. The system for routing calls, as recited in claim 17, wherein the mobile switching center is operable to perform a second query to the home location register based upon the results of the query to the number portability database.

20. The system for routing calls, as recited in claim 12, wherein if the first indicator and the second indicator are true, the mobile switching center is operable to query the number portability database to determine whether the directory number is ported.

21. The system for routing calls, as recited in claim 20, wherein the mobile switching center is further operable to route the call to a trunk group associated with a local routing number returned by the number portability database.

22. The system for routing calls, as recited in claim 20, wherein the mobile switching center is further operable to query the home location register based upon the results of the query to the number portability database.

23. In a mobile switching center of a wireless telecommunications network, the network containing a number portability database communicating with the mobile switching center, the number portability database storing a plurality of local routing numbers associated with a plurality of ported mobile directory numbers, and a home location register communicating with the mobile switching center, the home location register storing a plurality of directory numbers, the improvement comprising:
- a table stored in the mobile switching center containing:
  - at least one central office code;
  - a first true/false indicator of the portability of the at least one central office code; and
  - a second true/false indicator of the assignment of the at least one central office code to the mobile switching center.

24. The mobile switching center, as recited in claim 23, wherein if the first and second indicators are false, the mobile switching center is operable to route the call to a trunk group associated with an office code of the directory number.

25. The system for routing calls, as recited in claim 23, wherein if the first indicator is false and the second indicator is true, the mobile switching center is operable to query the home location register to determine whether the mobile switching center services the directory number.

26. The system for routing calls, as recited in claim 25, wherein the mobile switching center is operable to route the call to a destination based upon the results of the query to the home location register.

27. The system for routing calls, as recited in claim 25, wherein the mobile switching center is operable to provide a predetermined vacant code treatment based upon the results of the query to the home location register.

28. The system for routing calls, as recited in claim 23, wherein if the indicator is true and the second indicator is false, the mobile switching center is operable to query the number portability database.

29. The system for routing calls, as recited in claim 28, wherein the mobile switching center is operable to route the call according to a routing table associated with the office code of a routing number returned by the number portability database.

30. The system for routing calls, as recited in claim 28, wherein the mobile switching center is operable to perform a second query to the home location register based upon the results of the query to the number portability database.

31. The system for routing calls, as recited in claim 23, wherein if the first indicator and the second indicator are true, the mobile switching center is operable to query the number portability database to determine whether the directory number is ported.

32. The system for routing calls, as recited in claim 31, wherein the mobile switching center is further operable to route the call to a trunk group associated with a local routing number returned by the number portability database.

33. The system for routing calls, as recited in claim 31, wherein the mobile switching center is further operable to query the home location register based upon the results of the query to the number portability database.

34. A method for routing a call made to a directory number in a wireless telecommunications network, the method comprising the steps of:
- storing a table in a mobile switching center containing:
  - at least one central office code;
  - a first true/false indicator of the portability of the at least one central office code; and
  - a second true/false indicator of the assignment of the at least one central office code to the mobile switching center. routing the call to the mobile switching center;

referencing the office code of the directory number in the table in the mobile switching center; and routing the call based upon the first and second indicators corresponding to the office code of the directory number.

35. The method for routing calls, as recited in claim 34, wherein the step of routing the call based upon the first and second indicators further comprises the step of routing the call to a trunk group associated with an office code of the directory number if the first and second indicators are false.

36. The system for routing calls, as recited in claim 34 wherein the step of routing the call based upon the first and second indicators further comprises the step of querying the home location register to determine whether the mobile switching center services the directory number if the first indicator is false and the second indicator is true.

37. The method for routing calls, as recited in claim 36, wherein the step of routing the call based upon the first and second indicators further comprises the step of routing the call to a destination based upon the results of the query to the home location register.

38. The method for routing calls, as recited in claim 36, wherein the step of routing the call based upon the first and second indicators further comprises the step of providing a predetermined vacant code treatment based upon the results of the query to the home location register.

39. The method for routing calls, as recited in claim 34, wherein the step of routing the call based upon the first and second indicators further comprises the step of querying the number portability database if the first indicator is true and the second indicator is false.

40. The method for routing calls, as recited in claim 39, wherein the step of routing the call based upon the first and second indicators further comprises the step of routing the call according to a routing table associated with the office code of a routing number returned by the number portability database.

41. The method for routing calls, as recited in claim 39, wherein the step of routing the call based upon the first and second indicators further comprises the step of performing a second query to the home location register based upon the results of the query to the number portability database.

42. The method for routing calls, as recited in claim 34, wherein the step of routing the call based upon the first and second indicators further comprises the step of querying the number portability database to determine whether the directory number is ported if the first and second indicators are true.

43. The method for routing calls, as recited in claim 42 wherein the step of routing the call based upon the first and second indicators further comprises the step of routing the call to a trunk group associated with a local routing number returned by the number portability database.

44. The method for routing calls, as recited in claim 42 wherein the step of routing the call based upon the first and second indicators further comprises the step of querying the home location register based upon the results of the query to the number portability database.

* * * * *